(12) United States Patent
Abrishami (10) Patent No.: US 6,865,220 B2
(45) Date of Patent: Mar. 8, 2005

(54) SYSTEM AND METHOD FOR IMPLEMENTING AN END-TO-END ERROR-CORRECTING PROTOCOL IN A VOICE BAND DATA RELAY SYSTEM

(75) Inventor: Mehrdad Abrishami, Gaithersburg, MD (US)

(73) Assignee: LSI Logic Corporation, Milpitas, CA (US)

( * ) Notice: Subject to any disclaimer, the term of this patent is extended or adjusted under 35 U.S.C. 154(b) by 743 days.

(21) Appl. No.: 09/779,530

(22) Filed: Feb. 9, 2001

(65) Prior Publication Data

US 2001/0046259 A1 Nov. 29, 2001

Related U.S. Application Data (60) Provisional application No. 60/182,110, filed on Feb. 11, 2000.

(51) Int. Cl.[7] .............................. H04B 1/38; G06F 15/16
(52) U.S. Cl. ....................... 375/220; 375/222; 709/249; 370/232
(58) Field of Search ................................. 370/229, 230, 370/231–235, 230.1, 401; 375/222; 709/230, 234, 235, 238

(56) References Cited

U.S. PATENT DOCUMENTS

| | | | | |
|---|---|---|---|---|
| 5,301,186 A | * | 4/1994 | Galuszka et al. | 370/216 |
| 5,506,839 A | * | 4/1996 | Hatta | 370/236 |
| 5,546,388 A | * | 8/1996 | Lin | 370/389 |
| 5,852,631 A | * | 12/1998 | Scott | 375/222 |
| 5,930,250 A | * | 7/1999 | Klok et al. | 370/352 |
| 5,940,479 A | * | 8/1999 | Guy et al. | 379/93.01 |
| 5,940,598 A | * | 8/1999 | Strauss et al. | 709/249 |
| 5,943,364 A | * | 8/1999 | Yoshida | 375/222 |
| 5,949,819 A | * | 9/1999 | Bjarnason et al. | 375/222 |
| 6,018,515 A | * | 1/2000 | Sorber | 370/229 |
| 6,021,114 A | * | 2/2000 | Shaffer et al. | 370/232 |
| 6,021,183 A | * | 2/2000 | Yoshida | 379/93.08 |
| 6,381,238 B1 | * | 4/2002 | Hluchyj | 370/352 |

OTHER PUBLICATIONS

International Telecommunication Union, "ITU–T Recommendation V.32", Mar. 1993.*
International Telecommunication Union, "ITU–T Recommendation V.34", Feb. 1998.*
International Telecommunication Union, "ITU–T Recommendation V.8", May 1999.*
International Telecommunication Union, "ITU–T Recommendation V.32 bis", 1991.*
International Telecommunication Union, "ITU–T Recommendation V.90", Sep. 1998.*
International Telecommunication Union, "ITU–T Recommendation V.22", 1993.*
International Telecommunication Union, "ITU–T Recommendation V.22 bis", 1993.*
International Telecommunication Union, "ITU–T Recommendation V.42 bis", 1990.*
International Telecommunication Union, "ITU–T Recommendation V.42", Mar. 1993.*

* cited by examiner

Primary Examiner—Chieh M. Fan
Assistant Examiner—Jason M. Perilla
(74) Attorney, Agent, or Firm—Trexler, Bushnell, Giangiorgi, Blackstone & Marr, Ltd.

(57) ABSTRACT

A system and method to establish an end-to-end error correcting protocol between two voice band data modems over a network including voice band data relay gateways, where part of the end-to-end connection is via low data rate narrowband network. Using a partial implementation of V.42 LAPM protocol within the data relay gateways, the system allows the independent selection of modulation schemes at each gateway as well as increased user data throughput by removing non-informational data. Flow control of the user data to match the channel rate of the narrowband network may also be provided.

32 Claims, 7 Drawing Sheets

SYSTEM AND METHOD FOR IMPLEMENTING AN END-TO-END ERROR-CORRECTING PROTOCOL IN A VOICE BAND DATA RELAY SYSTEM

CROSS REFERENCE TO RELATED APPLICATIONS

The present application is related to and claims priority to now abandoned U.S. provisional application Ser. No. 60/182,110 filed Feb. 11, 2000. The contents of that provisional application are incorporated in their entirety herein by reference.

BACKGROUND OF THE INVENTION

A. Field of the Invention

The present invention relates to voice band data transmission and, more particularly, to a system and method for implementing an end-to-end error-correcting protocol in a voice band data relay system.

B. Description of the Related Art

The Telecommunication Standardization Section of ITU (ITU-T) has defined procedures for duplex modems operating on the general switched telephone network and on leased telephone-type circuits. ITU-T Recommendation V.42 describes error-correcting protocols for use with V-Series duplex Data Computer Equipment (DCE) to accept start-stop data from the Data Terminal Equipment (DTE) and transmit in synchronous mode. Recommendation V.42 is based on providing data communication using a V-Series modem using a Public Switch Telephone Network (PSTN) or a digital network capable of carrying a digital representation of an analog signal, such as pulse code modulation (PCM). Recommendation V.42 contains an HDLC-based protocol referred to as the Link Access Procedure for Modems (LAPM). Additionally, an alternative procedure is defined in Annex A of the Recommendation. Compliance with Recommendation V.42 requires implementation of both these protocols.

Figure 1:
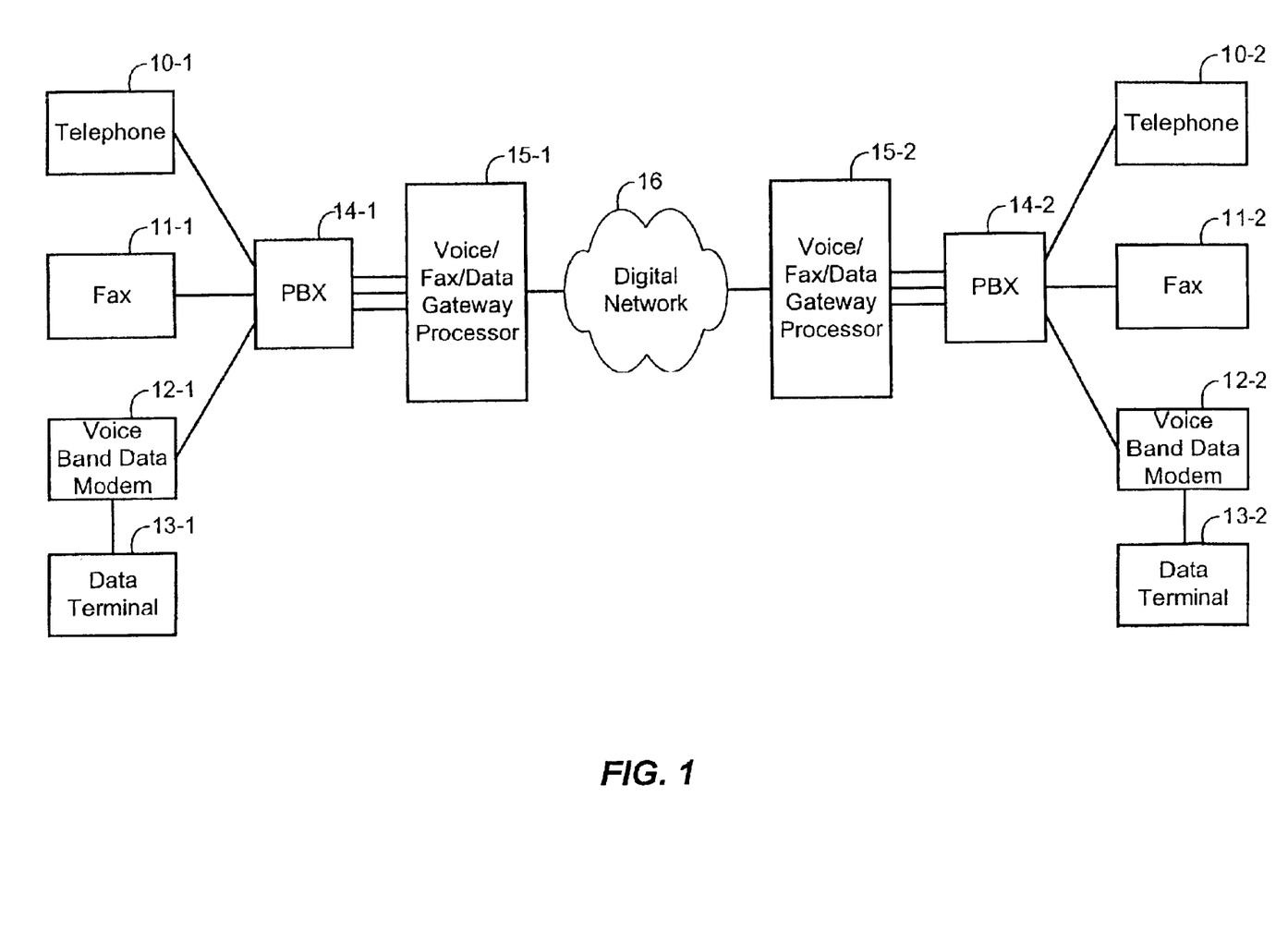
FIG. 1 is a block diagram of a conventional voice band data network including voice band data relay gateways, where the transmission path includes a low speed network.

FIG. 1 shows a system by which two voice band data modems, telephones, or facsimile machines communicate with each other, whereby a narrowband network is utilized in the communications path between the two data modems, telephones, or facsimile machines. In order to support V-Series modem connectivity over a digital narrowband network, the analog signal can be demodulated by a first gateway and the demodulated data can be transmitted over the narrowband network by the first gateway to the second gateway. The demodulated data can be re-modulated at the second gateway.

Referring to FIG. 1, a data terminal or computer 13-1 is communicatively connected to a first voice band data modem 12-1, which is communicatively connected to a first private branch exchange (PBX) 14-1, which in turn is communicatively connected to a first gateway processor 15-1. A telephone 10-1 and facsimile machine 11-1 are also communicatively connected to the PBX 14-1. The PBX 14-1 may alternatively be a PSTN or a plain old telephone system (POTS). The first gateway processor 15-1 provides connectivity with a narrowband network, which is shown as digital network 16 in FIG. 1.

Voice band data is typically transmitted over conventional analog telephone lines, such as those used by a PSTN or PBX, using 64 bit-per-second pulse code modulation (PCM). The PCM-modulated fax data (analog data) needs to be converted to a different form, that is, into digital data, by the first gateway 15-1, so that the digital data can be transmitted over the digital network 16.

A second gateway 15-2 provides a communicative connection to a second PBX 14-2, which provides a communicative connection to a second voice band data modem 12-2. Like the first PBX 14-1, the second PBX 14-2 may alternatively be a PSTN or a POTS. The second gateway 15-2 receives digital data from the digital network 16, and converts the digital data into analog data having a PCM format. The PCM data is then sent over the second PBX 14-2, whereby it is received by the second data modem 12-2.

The digital network 16 is typically of a narrower bandwidth than the analog portions (PBX 14-1, 14-2) of the communications path between the first and second data modems 12-1, 12-2. The digital network 16 may be a packet network or switched network, but could be any bandwidth limited or low rate communication system. The bandwidth limitations of the network 16 may be the result of congestion or other circumstances.

Typically, voice band data modems are capable of negotiating a common modulation/re-modulation scheme and data rate. In order to achieve inter-networking between different modems, additional protocols for call discrimination and modem type discrimination are employed. One method is to establish the same modulation scheme and data rate at both gateways to the analog network. Once the end-to-end modulation scheme has been established and a full duplex digital bit-pipe exists between the two gateways, the V.42 error-correcting protocol can be established transparently between the two modems via the bit-pipe. Currently, there are two techniques for establishing end-to-end V.42 error-correcting protocol when employing voice band data relay. These methods are described below.

The first method is based on local implementation of the Recommendation V.42 protocol (LAPM and Annex A) at the gateways, and transmission of the user information over the digital network via another HDLC based (or transport layer) protocol to ensure the data integrity. In this method the V.42 protocol is established between each data modem and the gateway to which the modem is connected. This approach can ensure that the data transfer over the link (i.e. the narrowband network) is optimized since non-informational data associated with the V.42 protocol can be removed by the gateways and not transmitted over the digital network. In addition, the gateways at each end can use flow-control to ensure that the modem data rate not greater than the available network bandwidth. The main disadvantage of this approach is that the complete Recommendation V.42 and Annex A protocols must be implemented at the gateways, and the memory required to implement these protocols may be greater than the available resources in the gateways.

A second method is transparent transmission of the demodulated data between the gateways. In this method, the V.42 protocol is established transparently between the end-to-end data modems without the knowledge of the relay gateways. This method can only be implemented if the network delay is less than 350 ms in one direction, as a result of a timer T400, defined in Recommendation V.42 (although, the timer T400 has a default value and is defined to be configurable, in most cases the value cannot be configured by the user). The relay gateways cooperate in establishing an end-to-end bit-pipe by selecting a common modulation/demodulation scheme. Following establishment of the bit-pipe, the data is transported across the link without protocol interpretation by the gateways. The gateways may reformat the user data into packets and add control and timing information, but implementation of the V.42 protocol at the gateway is not required. The advantage is a simple implementation, which requires less resources at the gateways. In addition, there is no need to have the V.42 layer implemented at the gateways.

The disadvantage is that the V.42 protocol will not be established if the network delay (end-to-end) is greater than 750 ms as controlled by the V.42 T400 timer (MNP protocol which is defined in V.42 Annex A has more a relaxed requirement but is also limited to a set timeout) Another disadvantage is that the established end-to-end modulation rate must be less than or equal to the channel rate (i.e. the throughput of the narrowband network). This disadvantage becomes apparent when demodulating and re-modulating a V.32 signal over an 8 kbps channel. V.32 modems have two rates of operation, one is 9600 bps and the second is 4800 bps. When the channel rate between the gateways is less than 9600 bps, the V.32 rate selection between the end-to-end is set to 4800 bps. This results in a low channel utilization—in this case the channel utilization is 4800/8000 or 60%.

Yet another disadvantage of this second method is that non-informational messages such as "Inter-frame fill" flags (defined in Recommendation V.42) are transmitted over the narrowband network. Inter-frame fill flags are transmitted between the end-to-end modems when there is no user data to be transmitted. Yet another disadvantage of this second method is that there is no mechanism to perform flow control locally between the gateway and the data modem at each end. Since the demodulated user data is at a constant stream, any fluctuation in the transmission rate over the narrowband network (e.g. a packet network) may result in loss of user information. Although jitter buffers can be used to provide a limited remedy for packet jitter in the network, there is no specific mechanism to flow control the data to match the effective network throughput.

SUMMARY OF THE INVENTION

The invention provides a system and method for implementing an end-to-end error correcting protocol which reduces or eliminates the above disadvantages. One aspect of the invention is a method of data transmission between first and second modems over a network, where a first gateway is connected to a first modem, a second gateway is connected to a second modem, and the first and second gateways are connected via the narrowband network.

The method includes transmitting modulated signals from the first modem to the first gateway, demodulating the signals at the first gateway to obtain demodulated data, transmitting the demodulated data over the narrowband network, re-modulating the demodulated data at the second gateway, and transmitting the re-modulated signals from the second gateway to the second modem.

An end-to-end error correcting protocol is established between the first and second modems, and the demodulated data to be transmitted over the narrowband network is monitored at the first gateway. Transmission of signals from the first modem is suspended if the transmission rate of the demodulated data to be transmitted over the narrowband network exceeds a first value, and the transmission of signals is resumed if the transmission rate is less than a second value.

Monitoring of the demodulated data to be transmitted over the narrowband network may include storing the data in a transmit buffer, and comparing the amount of the data stored in the transmit buffer to a third value to determine if the transmission of the signals from the first modem should be suspended. Suspending the transmission of signals may be accomplished by generating a valid RNR frame, modulating the RNR frame at the first gateway, and transmitting the RNR frame to the first modem. Resuming the transmission of signals may be accomplished by generating a valid RR frame, modulating the RR frame at the first gateway, and transmitting the RR frame to the first modem.

The method may also include maintaining at the first gateway a first value indicating a current flow control state of the first modem, receiving at the first gateway a supervisory frame from the narrowband network for control of flow of data between the modems, the supervisory frame including a second value indicating a flow control state, comparing the first and second values, modifying the supervisory frame from an RR frame to a valid RNR frame if the first value does not match the second value, and transmitting the RNR frame to the first modem.

The step of transmitting the demodulated data over the narrowband network may include removing first non-informational data from the demodulated data, transmitting the modified demodulated data without the first non-informational data over the narrowband network, and generating second non-informational data when no data is received from the narrowband network, and combining the second non-informational data and the modified demodulated data.

The step of removing first non-informational data from the demodulated data may further include storing the demodulated data in a transmit buffer at the first gateway, and removing first non-informational data from the transmit buffer. In addition, the step of combining the second non-informational data and the modified demodulated data may include storing the modified demodulated data in a receive buffer at the second gateway, and inserting the second non-informational data into the receive buffer after a last received frame of the modified demodulated data.

The method may also include discriminating at the first gateway between voice and voice band data modulated signals, switching at the first gateway to an alternate mode of signal processing to process voice band data as modem tones and modulated signal instead of voice. The first gateway may include a codec, a voice band data modem, and a fax modem, and the method may include discriminating at the first gateway between voice, voice band data, and fax modulated signals from the first modem, processing the voice signals using the codec, processing the voice band data signals using the voice band data modem, and processing the fax signals using the fax modem.

Modem training may also be implemented at the first and second gateways, the duration of the first modem training being adjusted based on progress of the second modem training, and the duration of the second modem training being adjusted based on progress of the first modem training.

The first gateway may include memory and the method may include modifying supervisory data at the first gateway so that a maximum message length transmitted between the first and second modems is less than a predetermined limit based on the size of the first memory.

The method may also include selecting a modulation and demodulation scheme at the first and second gateways based on the capabilities of the first and second modems and the channel rate of the narrowband network.

The first and second modems may be V.34 modems, and their capabilities may be determined by decoding a V.8 answer sequence generated by the modems. The first modem may be a V.32 modem, a V.32 bis modem, a V.34 modem operating in auto-mode, or a V.90 modem operating in auto-mode, and the selection of the modulation and demodulation scheme may include detection of an 1800 Hz tone from the first modem. The modulation and demodulation scheme and the rate of modulation and demodulation at the first and second gateways is different. The modulation and demodulation scheme may be V.32 at 4800 bps at the first gateway and V.22 bis at 2400 bps at the second gateway, or V.32 at 9600 bps at the first gateway and V.32 at 4800 bps at the second gateway, or V.32 bis at 14,400 bps or 12,000 bps or 9600 bps or 7200 bps or 4800 bps at the first gateway and V.32 bis at 14,400 bps or 12,000 bps or 9600 bps or 7200 bps or 4800 bps at the second gateway.

The end-to-end error correcting protocol may be detected by the first gateway by decoding a V.8 sequence transmitted by the first and second modems, and the error correcting protocol may be V.42 LAPM or an error correcting protocol as defined in V.42 Annex A.

Another aspect of the invention is a gateway for voice band data transmission over a network. A first modem is connected to the gateway, a second modem is connected to a second gateway, and a narrowband network connects the gateway and the second gateway. The gateway includes a voice band data modem for demodulating signals received from a first user modem to generate demodulated data for transmission over the narrowband network, and for modulating data received from the narrowband network, a voice band data protocol for inter-networking of the first and second modems, and a partial V.42 protocol.

The partial V.42 protocol is for detecting establishment of an end-to-end error correcting protocol between the first and second modems, monitoring at the first gateway the demodulated data to be transmitted over the narrowband network, suspending transmission of the signals from the first modem if a transmission rate of the demodulated data to be transmitted over the narrowband network exceeds a first value, and resuming transmission of the signals from the first modem if the transmission rate is less than a second value.

The gateway may also include a receive buffer for storing the data received from the narrowband network, and a transmit buffer for storing the demodulated data to be transmitted over the narrowband network, and the partial V.42 protocol may compare an amount of the demodulated data stored in the transmit buffer to a third value to determine if transmission of the modulated signals from the first modem should be suspended. The partial V.42 protocol may also include logic for removing first non-informational data from the transmit buffer, and inserting second non-informational data into the receive buffer after a last received frame of the data received from the narrowband network.

BRIEF DESCRIPTION OF THE DRAWINGS

The foregoing advantages and features of the invention will become apparent upon reference to the following detailed description and the accompanying drawings, of which.

DESCRIPTION OF SPECIFIC EMBODIMENTS

Reference will now be made in detail to specific embodiments of the invention, examples of which are illustrated in the accompanying drawings. Wherever possible, the same reference numbers will be used throughout the drawings to refer to the same or similar parts.

In an embodiment of the invention, a "partial V.42 LAPM protocol" is implemented to permit establishment of LAPM protocol between two V-Series modems using intermediary gateways in "bandwidth limited" or low rate digital communication systems, with the ability to have local flow control and an asymmetric modulation scheme at the two ends of the voice band data relay, while allowing the establishment of the V.42 LAPM protocol transparently.

Figure 2:
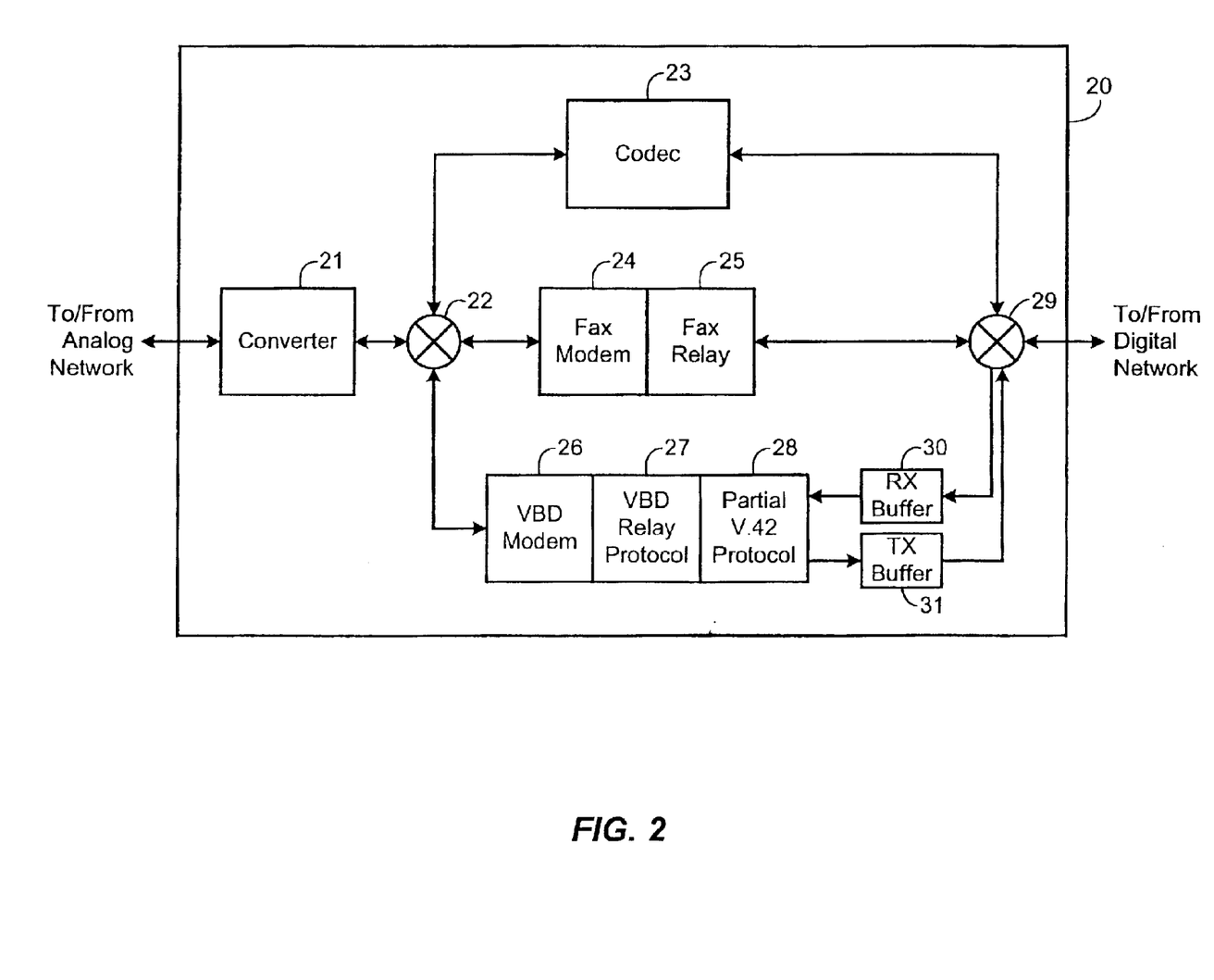
FIG. 2 is a block diagram of a voice band data relay gateway supporting a partial V.42 protocol.

FIG. 2 illustrates the functional components of one embodiment of a voice band data relay gateway 20 supporting a partial V.42 LAPM protocol. The voice band data relay gateway 20 may be implemented using a digital signal processor (DSP) or other suitable technique. A converter module 21 converts PCM encoded data into linear data in the analog to digital direction as well as a converting linear data to PCM encoded data in the digital to analog direction.

Detectors 22 and 29 are used to discriminate voice, fax, and data traffic. The detectors 22 and 29 provide switchover from processing the signals as voice to processing the signals as voice band data. Codec 23, and fax modem 24 and fax relay 25, are provided for data or fax traffic respectively. Alternatively, the gateway 20 may provide a dedicated circuit supporting voice band data only traffic, so that detectors 22 and 29, codec 23, fax modem 24, and fax relay 25 are not required.

A voice band data (VBD) modem 26 (or bank of VBD modems) is also provided. For example, these may include V.22bis, V.32, V.32bis, V.34, and/or V.90 modems.

VBD relay protocol 27 provides for inter-networking of V-Series modem. For example, VBD modem 26 may implement the V.22bis or V.32bis protocol. VBD relay protocol 27 also includes a mechanism to adjust the modem training periods to synchronize the establishment of the end-to-end bit pipe to transmit and receive the user data. U.S. Pat. No. 5,963,621, which is herein incorporated by reference, describes an example of adjusting the end-to-end timing for V.32.

A receive buffer 30 is provided to receive the demodulated data as well as protocol control information from the digital network to be processed by the protocol and to be modulated via the VBD modem 26 toward the analog network. This buffer will be referred to as the "return symbol FIFO." A transmit buffer 31 is provided to hold the demodulated data from VBD modem 26 to be transmitted toward the digital network. This buffer will be referred to as the "forward symbol FIFO".

The partial V.42 protocol 28 may include components for: (1) determining if the end-to-end V.42 LAPM protocol is established; (2) flow rate control of user data between the voice band data modems and relay gateways at each end of the narrowband network; (3) monitoring the V.42 high level data link control (HDLC) supervisory frames, decoding the frame type and identifying the frames used for flow control such as Receive Ready (RR), Receive Not Ready (RNR), and Frame Reject; (4) optimizing channel utilization by removal and re-insertion of non-informational data; and (5) adjustment of the supervisory frame parameters to facilitate the above functions.

Figure 3:
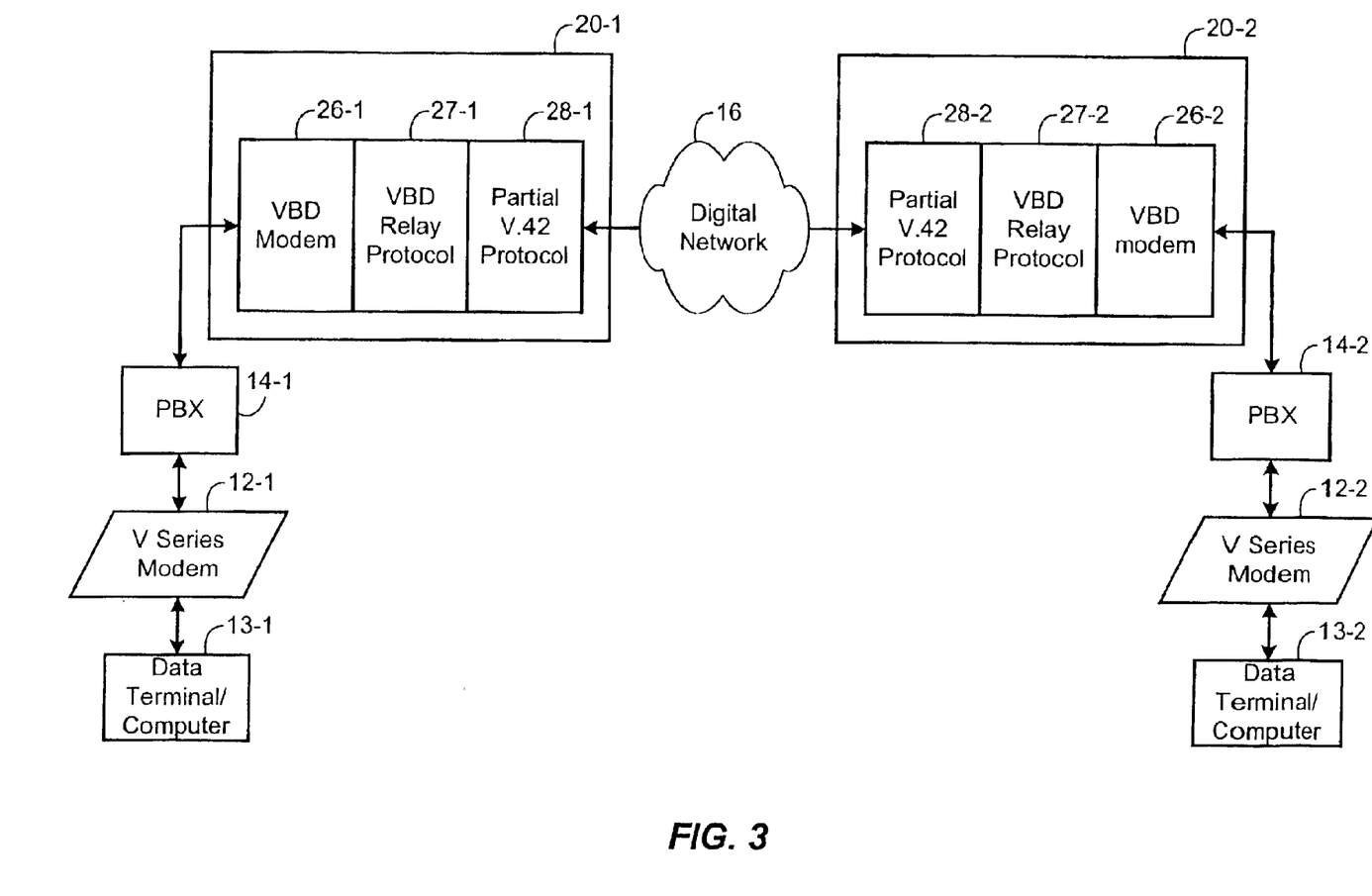
FIG. 3 is a block diagram of a voice band data network including a voice band data relay gateway supporting a partial V.42 protocol.

FIG. 3 shows the functional components of the voice band data relay gateway 20 supporting the partial V.42 protocol 28, implemented in a network for end-to-end communication between data terminals. At a minimum, the gateway (20-1 and 20-2) includes a set of voice band data modems (26-1 and 26-2), voice band data relay protocol (27-1 and 27-2) to establish the end-to-end digital bit-pipe, and the partial V.42 protocol (28-1 and 28-2).

Figure 4:
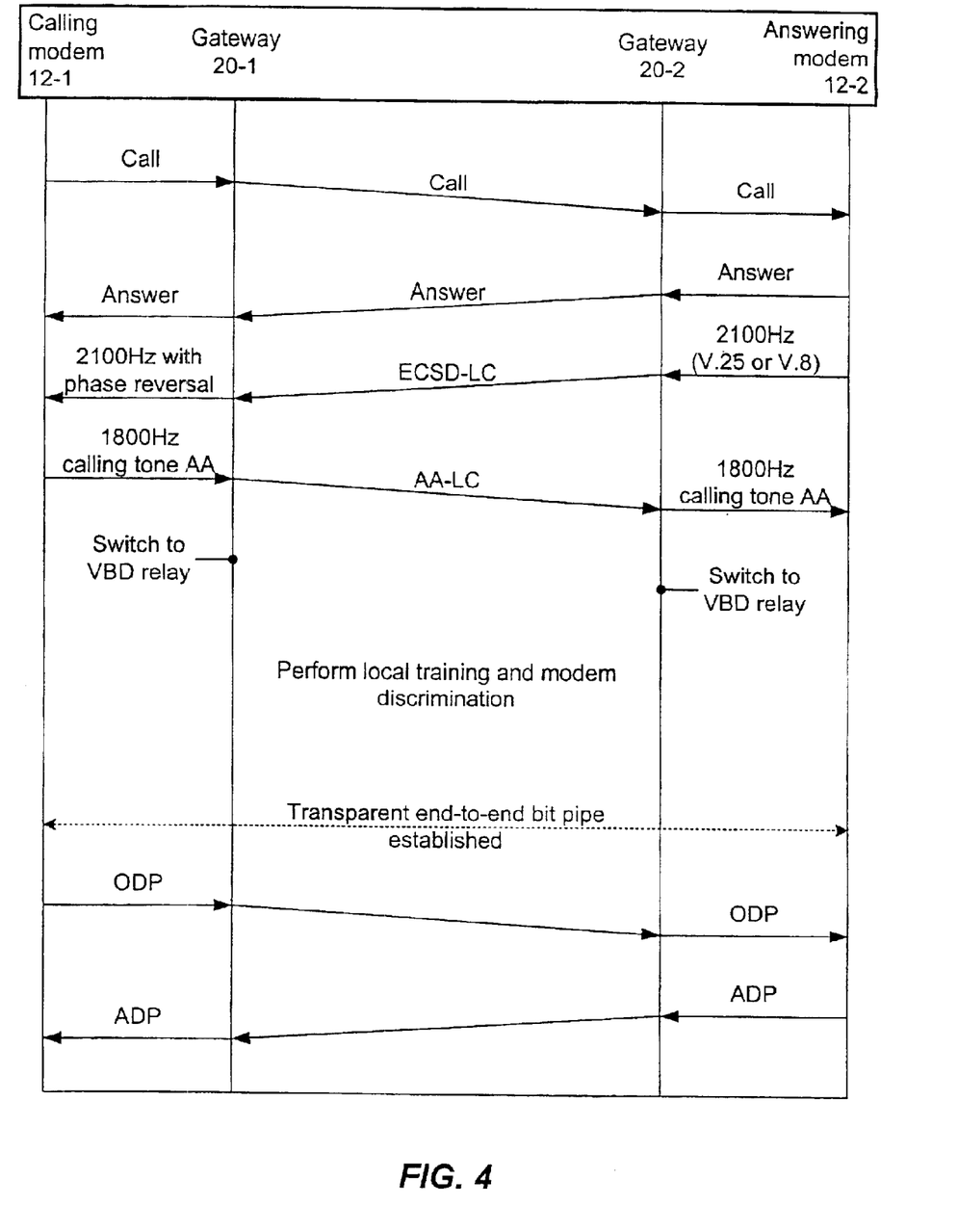
FIG. 4 is a timing ladder diagram showing the call setup and establishment of an end-to-end bit-pipe.

FIG. 4 illustrates a call setup, initiated when a user at a data terminal 13-1 dials a number corresponding to a far-end data terminal 13-2, the data terminals 13-1 and 13-2 being connected to the PSTN via V-Series modems 12-1 and 12-2 respectively. Upon detection of the call, the answering modem 12-2 goes off-hook and responds with a 2100 Hz answer tone. The answer tone is detected by the gateway 20-2. Gateway 20-2 informs gateway 20-1 of the detection using a control packet, which is transmitted toward the network in place of a voice-encoded frame. This control packet is encoded such that it would be detected to include control information instead of codec encoded voice frames.

Subsequently, gateway 20-1 regenerates the 2100 Hz answer tone with phase reversal every 450+/−50 ms according to ITU-T Recommendation V.25. The calling modem 12-1 then generates a calling tone AA, defined in ITU-T Recommendation V.32bis as an 1800 Hz tone. Upon detection of calling tone AA, gateway 20-1 logically switches to process the analog or PCM signal as a voice band data signal instead of a voice signal. The gateway 20-1 then transmits a control packet to gateway 20-2 to cause the regeneration (or relay) of the 1800 Hz tone.

The answering modem 12-2 then transmits alternate carrier states A and C as defined in ITU-T Recommendation V.32bis. The detection of this signal by gateway 20-2 results in the logical switchover, such that gateway 20-2 switches to a state to process the analog or PCM signal as a V.32bis modem. The state transition between voice processing and voice band data (VBD) processing is illustrated in FIG. 5.

Figure 5:
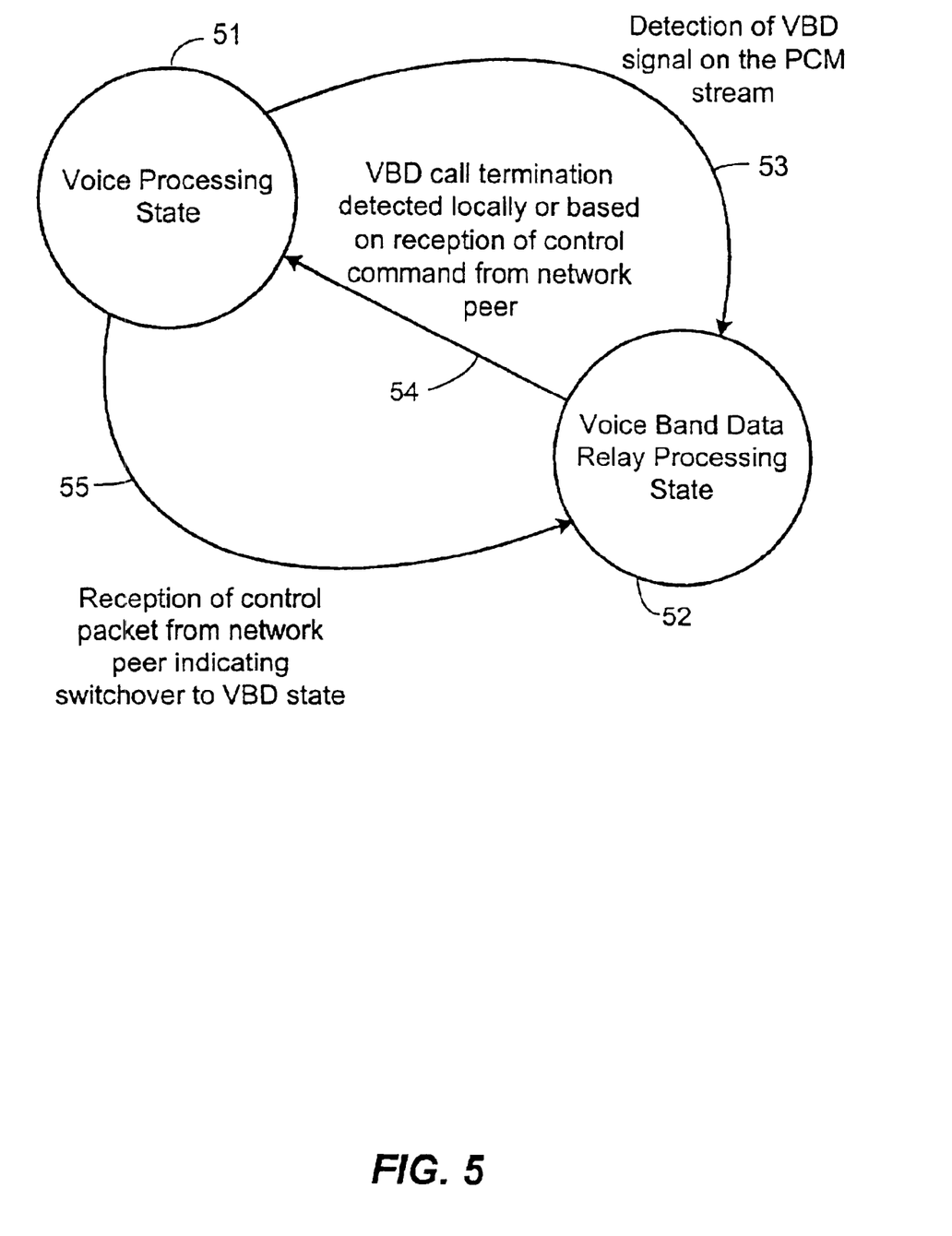
FIG. 5 is a state diagram showing switchover between voice processing and voice band data processing.

FIG. 5 shows a state machine consisting of two processing states for the gateways. The Voice Processing State 51 is the initial state. When the gateway is in voice processing state 51, the gateway processes the input signal from the analog network as a voice signal. The voice signal is encoded via a Codec and the encoded data is sent to the other gateway via the digital network. In addition, while the gateway is in the voice processing state 51, it monitors the analog input for the presence of voice band data modem signals. If a voice band data modem on the analog side is detected by a gateway the gateway transitions to Voice Band Data Relay Processing State 52 (as indicated by arrow 53), and the gateway transmits a control packet to the other gateway via the digital network to inform the other gateway of the detection of the voice band data modem. Also, when a gateway receives a control packet from the digital network indicating switchover to voice band data processing by a peer gateway, the gateway receiving the command also transitions to the voice band data relay processing state 52 (as indicated by arrow 55).

A gateway remains in state 52 unless it detects the voice band data call termination or the gateway receives a termination packet from the peer gateway (as indicated by arrow 54). A gateway locally detecting the end of voice band data transmits a control packet to the other gateway to notify that gateway that the voice band data call is terminated and that it has switched its processing state to state 51.

Referring back to FIG. 4, following the logical switchover to the VBD processing state, each gateway performs local modem training as defined in ITU-T Recommendation V.32bis, between the voice band data modem and the gateway.

The duration of the modem training sequence at each gateway is adjusted based on the progress in modem training from the other gateway. Each gateway communicates with the other gateway to control the length of the segments of the V.32bis training to ensure the creation of an end-to-end ple-synchronous digital bit pipe. In another embodiment, the answering gateway may respond with the signal USB1, defined in the ITU-T Recommendation V.22bis. In that case, the V.22bis modulation scheme is used to establish an end-to-end bit pipe.

After the end-to-end bit pipe is established, a method is employed to allow the establishment of the V.42 protocol transparently, if the V.42 protocol is supported by the modems at both ends. Buffering of the transparent data allows for absorption of the rate difference between the modulation/demodulation scheme and the link.

Detecting the Establishment of V.42 LAPM Protocol

The partial V.42 protocol 28 includes facilities for detecting calling and answering data modems supporting V.42 protocol and for determining if the end-to-end V.42 LAPM protocol has been established. This may be achieved by negotiating the capabilities of the modems at the start of the call, or by detecting LAPM establishment after establishment of the end-to-end bit pipe. These two methods are described below.

A first method includes decoding of the procedures for starting sessions of data transmission. This procedure is defined in V.25 as well as V.8. If the V.8 sequence is used by the calling and answering modems, the calling and answering voice band data modems can inter-change capabilities as well as request services at the start of a session.

When using V.8 protocol, the calling voice band data modem transmits a Call Menu signal (CM). CM is a signal transmitted from the calling DCE primarily to indicate modulation modes available in the calling DCE. CM consists of a repetitive sequence of bits at 300 bit/s, modulating V.21(L), the low-band channel defined in Recommendation V.21.

When using the V.8 protocol the answering voice band data modem responds by transmitting Joint Menu signal (JM). JM is a signal transmitted from the answering DCE primarily to indicate modulation modes available jointly in the calling and answering DCEs. JM consists of a repetitive sequence of bits at 300 bit/s, modulating V.21(H), the high-band channel defined in Recommendation V.21.

If the LAPM protocol code is indicated in CM, and the answering DCE wishes to use LAPM, a protocol octet is also transmitted in JM indicating LAPM. The CM and JM sequence is decoded at the gateways to decode the "protocol category" used by the two voice band data modems.

A second method of detecting LAPM establishment involves monitoring the demodulated data following the establishment of the end-to-end bit-pipe. This method requires the monitoring of the originator detection pattern/ answer detection pattern (ODP/ADP) sequence, as well as setting timeout periods based on the V.42 protocol.

Figure 6:
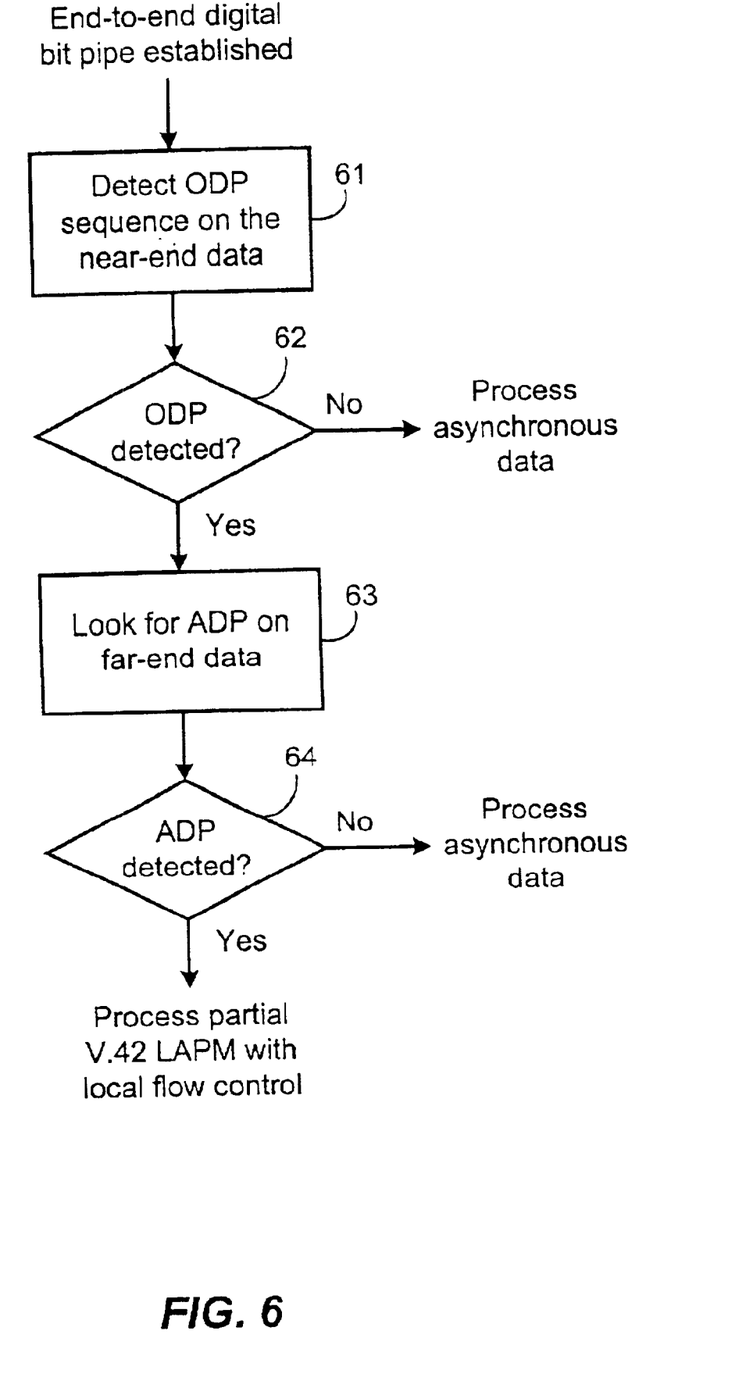
FIG. 6 is a flow chart of an LAPM call establishment detection algorithm by a voice band data gateway closer to a calling modem.
Figure 7:
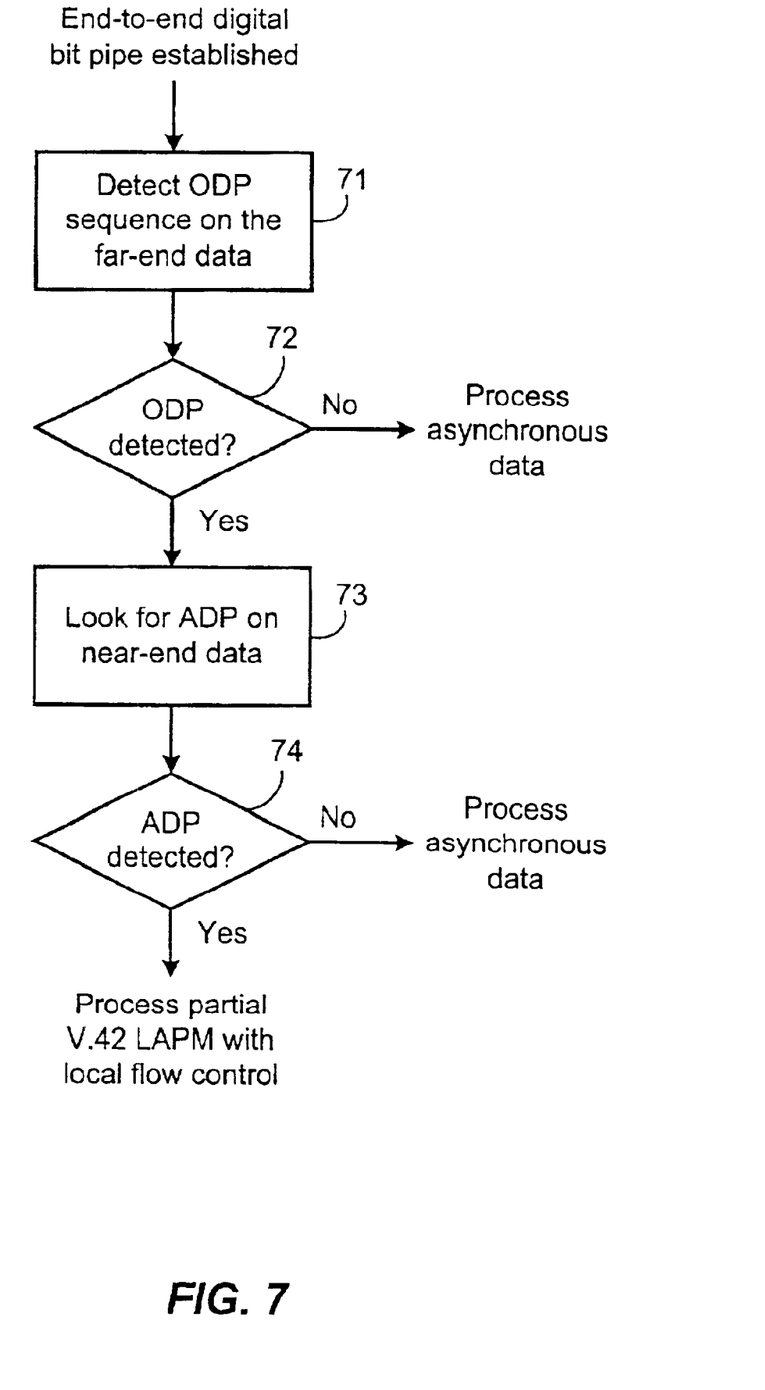
FIG. 7 is a flow chart of an LAPM call establishment detection algorithm by a voice band data gateway closer to an answering modem.

FIGS. 6 and 7 illustrate flow diagrams of the logic used by the gateways to detect the establishment of the LAPM protocol. FIG. 6 illustrates logic that may be used by the gateway closer to the calling voice band data modem, and FIG. 7 illustrates logic that may be used by the gateway closer to the answering voice band data modem.

Referring to FIG. 6, if the gateway closer to the calling voice band data modem does not find an originator detection pattern (ODP) sequence in the near-end data, the V.42 protocol is not established and data transfer across the link is performed asynchronously, as shown in steps 61 and 62. If the ODP sequence is detected, the gateway looks for an answer detection pattern (ADP) sequence in the far-end data. If the ADP is not detected in the far-end data, the V.42 protocol is not established and data transfer across the link is performed asynchronously, as shown in steps 63 and 64. If both an ODP sequence in the near-end data and an ADP sequence in the far-end data are detected, then the V.42 protocol is established.

Referring to FIG. 7, if the gateway closer to the answering voice band data modem does not find an ODP sequence in the far-end data or does not find an ADP sequence on the near-end data, the V.42 protocol is not established and data transfer across the link is performed asynchronously, as shown in steps 71 to 74. If both an ODP sequence in the far-end data and an ADP sequence in the near-end data are detected, then the V.42 protocol is established.

Buffering of the transparent data by the gateways allows for absorption of the rate difference between the modulation/demodulation scheme and the link during the detection phase. The buffer size is preferably sufficient to allow the establishment of the V.42 protocol and the exchange of the call establishment information. For example, if the channel rate difference between 9.6K and 8K is 1.6K, then for each second of V.42 negotiation, 1.6K bytes of buffering is required.

Flow Control

The modulation rate for the VBD modems 26-1 and 26-2 is controlled by the VBD relay protocol 27-1 and 27-2 respectively, based on the digital link rate. However, using the flow control scheme described here, the rate of modulation of the VBD modems 26-1 and 26-2 can be independent of the digital channel rate (i.e. the channel rate of the narrowband network), and independent of each other. For example, if the channel rate is 8 Kbps, the VBD modem 26-1 can train at 9.6 Kbps, while the flow of the user data from V Series modem 12-1 is controlled via local flow control.

Two methods of flow control may be used based on the initial call type. In the first method, if the V.42 LAPM error-correcting protocol is not supported by either side of the link or when failure of the detection phase indicates that the remote DCE does not support V.42 error-correcting operation, or when establishment of any alternative error-correcting capability has failed, the control function may either disconnect from line, or fall back to asynchronous non-error-correcting operation and inter-work with the remote non-error-correcting DCE according to the procedures specified in Recommendation V.14. In this case the flow control is via use of DC1/DC3 characters (XON/XOFF functions). When the gateway transmit buffers toward the network exceed a defined threshold, a not-ready condition is indicated by transmitting a DC3 character toward the near-end terminal. This not-ready condition is cleared by transmitting a DC1 character toward the near-end terminal.

A second flow control method may be used when the V.42 LAPM protocol is supported by the modems at both ends. Support for the V.42 LAPM protocol is communicated during a "detection phase" of the V.42 protocol as defined in ITU-T Recommendation V.42. In this case, flow control is via modification of the LAPM "supervisory" frames. The LAPM "supervisory" frames are HDLC based frames. Alternatively the selection of V.42 LAPM protocol may be achieved by use of an Answering Sequence as defined in ITU-T Recommendation V.8. In this case, local flow control is achieved by the use of LAPM supervisory frames RR, RNR, and Frame Reject.

While the LAPM protocol is not actually implemented in the gateway, the protocol and user frames are monitored and, when required, supervisory frames are altered to allow for the adjustment of the user data rate. This provides a means to establish a modem rate (modulation scheme) between the voice band modem and gateway which is independent of the channel rate of the narrowband network, and provides the ability to have an asymmetric modulation scheme at the two end of the voice band data relay.

The amount of demodulated data to be transmitted over the digital network to the other gateway is monitored at both gateways. For example, if the amount of the data in the transmit buffer 31 containing the demodulated data to be transmitted toward the digital network 16 (i.e. the forward symbol FIFO) is greater than a pre-defined threshold, the flow of data from the transmitting modem 12-1 is suspended by inserting a valid RNR packet in the signal stream being sent to the transmitting modem 12-1. The RNR packet is modulated and transmitted toward the transmitting modem 12-1. If the amount of the data at the transmit buffer 31 is less than a pre-defined threshold, the flow of data from the transmitting modem 12-1 is restarted by inserting a valid RR frame (with a correct sequence number reflecting the last frame received by gateway 20-1) to be modulated and transmitted toward the transmitting modem 12-1.

Flow control is performed based on link type (V.42 or asynchronous). This is based on the detection of the near-end forward symbol FIFO length against a given threshold. As shown in FIG. 2, the demodulated data to be transmitted over the digital network is buffered in transmit buffer 31. If the rate of the demodulation is greater than the channel rate of the digital network, there is a possibility that buffer 31 can overflow. Therefore, when the amount of data in buffer 31 is greater than a set threshold, the gateway 20 transitions into a flow control state where it attempts to slow down the rate of the user data from the analog network. Subsequently, if the amount of data in the buffer 31 is below a second threshold, the flow control of the user data is removed allowing the normal transmission of user data from the analog network.

Monitoring and Decoding of the Supervisory Frames

The gateways also monitor the transmission of supervisory frames that are initiated by the user modems to control the flow of data between the end-to-end modems. If the supervisory frame received by the gateway from the digital network (stored in the receive buffer 30 shown in FIG. 2) is inconsistent with the current state of the local flow control by the gateway toward a transmitting modem, then the gateway modifies the supervisory frame from an RR frame to a valid RNR frame with the correct sequence number, and recalculates the checksum before transmitting the supervisory frame to the modem.

Supervisory frames RR, RNR and Frame Reject frames are decoded to maintain the current N (R) value. The number of symbols in the forward symbol buffer (transmit buffer 31 shown in FIG. 2) that should be transmitted toward the digital network is monitored by the gateway. If the amount of the demodulated symbols indicates the need to flow control the transmitting voice band data modem, an RNR frame (with the proper N (R) field and CRC) is inserted following a valid frame in the return symbol buffer (receive buffer 30). The gateway is then in flow control state.

If the gateway is in flow control mode, any received RR packet from the digital network toward the analog network is translated to an RNR supervisory frame, while maintaining the N (R) field and recalculating the CRC. A timer is set in flow control mode, and when the timer expires the gateway retransmits and RNR packet toward the analog network. If the number of symbols in the forward symbol FIFO indicates that the flow control can be removed, an RR supervisory frame (with the proper N (R) field and correct CRC), is inserted following a valid frame on the return symbol FIFO.

Optimizing Channel Utilization

A gateway 20 supporting the partial V.42 LAPM protocol 28 monitors its transmit and receive queues toward the digital network, and injects or alters supervisory frames to control the overall link rate. If the data rate associated with the established modulation scheme is greater than the channel rate of the digital network, the removal of non-informational data and/or flow control of user data may be employed to adjust or control the rate of the user data to match the channel rate.

In a preferred embodiment, each gateway monitors the transmission of "Inter-frame Fill" flags (also referred to as "Inter-frame" flags) from the user modem toward the gateway. The demodulated inter-frame fill flags are removed from the buffer used to store the demodulated data to be transmitted toward the digital network (transmit buffer 31). To remove the inter-frame fill flags, the forward symbols are shifted to become octet aligned prior to transmission on the link. Following the octet alignment, the extra inter-frame fill flags will be removed from the transmit buffer 31.

Each gateway also inserts inter-frame fill flags in the buffer used to store the received data from the digital network. Since the communication link between a gateway and the user modem is synchronous, there should always be valid data that is being modulated by the modem. Therefore, if valid user data is not received from the digital network, the gateway performs insertion of flags in the receive buffer 30 (shown in FIG. 2). The flags are inserted immediately following the end of the last received frame, when there is no received data available from the digital network.

Adjustment of the XID Frame

The insertion of local flow control and removal/insertion of inter-frame flags can only occur at the end of a frame. The receive buffer 30 and transmit buffer 31 (shown in FIG. 2) should have sufficient memory to hold a complete information frame to enable this manipulation of the frames. However, if the user modems send very large frames, the gateways may be unable to buffer a complete frame. Therefore, at either gateway or at both gateways, the fields which govern the length of the transmit and receive information messages (frame length) used during the V.42 protocol may be modified to force the maximum frame length transmitted between the two user modems to be less than a predefined limit. This limit is determined by the availability of memory resource at the gateway(s).

The XID frame is used to negotiate the operating parameters of the V.42 protocol and includes the fields which govern frame length. The XID frame may be modified to adjust the information frame length by setting the I-Frame size. The default specified by V.42 is 128 bytes, however the negotiating partners can increase this to a higher value. In a preferred embodiment of the invention, the initiating XID frame is modified to set the maximum frame size to 128 bytes or lower. This ensures that the responder will set the final negotiated I-Frame size to 128 or lower. In the event that the gateway has access to large enough memory to store the largest possible V.42 information frame, the modification of the XID to manipulate the maximum information frame length may not be necessary.

The XID frame may also be modified to update of the CRC type to use the standard 16-bit CRC instead of 32-bit CRC. This can be used to reduce the calculation overhead associated with the CRC calculation.

While the present invention has been described with respect to certain embodiments, other types of configurations may be possible, while remaining within the spirit and scope of the present invention, as exemplified by the claims. For example, while the narrowband network has been described as a digital network in one embodiment, the narrowband network may be any other type of communication path such as a satellite transmission path, a frame relay network, a TDMA network, or a narrowband analog network, while remaining within the scope of the invention as described above.

Also, voice band data relay over the Internet, using an Internet Protocol (e.g., IP), may be substituted for the narrowband network, thereby allowing voice band data relay over the Internet even during high congestion times. Voice band data relay over compressed channels, voice band data over cellular networks, or voice band data over cable modems, may also be performed using the system and method according to the present invention.

Furthermore, wideband digital networks may be substituted for the PBX and PCM-encoded networks described above for the wideband portions of the voice band data network.

What is claimed is:

1. A method of data transmission between first and second modems over a network comprising a narrowband network, the method comprising:

providing first and second gateways, the first gateway connected to the first modem, the second gateway connected to the second modem, and the first and second gateways connected via the narrowband network;

transmitting modulated signals from the first modem to the first gateway;

demodulating the signals at the first gateway to obtain demodulated data;

transmitting the demodulated data over the narrowband network;

receiving the demodulated data at the second gateway;

re-modulating the demodulated data at the second gateway;

transmitting the re-modulated signals from the second gateway to the second modem;

establishing an end-to-end error correcting protocol between the first and second modems;

monitoring at the first gateway the demodulated data to be transmitted over the narrowband network;

determining if an amount of demodulated data waiting in a transmit buffer transmitted over the narrowband network exceeds a first value and if so, generating a valid receive not ready (RNR) frame, modulating the RNR frame at the first gateway, and transmitting the RNR frame to the first modem, thereby suspending the transmission of signals from the first modem; and determining if the amount of demodulated data waiting in the transmit buffer transmitted over the narrowband network is less than a second value and, if so, generating a valid receive ready (RR) frame, modulating the RR frame at the first gateway, and transmitting the RR frame to the first modem, thereby resuming the transmission of signals from the first modem, wherein transmitting the demodulated data over the narrowband network comprises:

removing first non-informational data from the demodulated data at the first gateway to provide modified demodulated data;

transmitting the modified demodulated data without the first non-informational data over the narrowband network to the second gateway;

generating second non-informational data at the second gateway; and combining the second non-informational data and the modified demodulated data.

2. The method according to claim 1, wherein monitoring the demodulated data further comprises:

comparing the amount of the demodulated data stored in the transmit buffer to a third value to determine if the transmission of the modulated signals from the first modem should be suspended.

3. The method according to claim 1, further comprising:

maintaining at the first gateway a first value indicating a current flow control state of the first modem;

receiving at the first gateway a supervisory frame from the narrowband network, the supervisory frame for control of flow of data between the modems, the supervisory frame including a second value indicating a flow control state;

comparing the first and second values;

modifying the supervisory frame from a RR frame to a valid RNR frame if the first value does not match the second value; and transmitting the RNR frame to the first modem.

4. The method according to claim 1, wherein removing first non-informational data from the demodulated data comprises:

storing the demodulated data in the transmit buffer at the first gateway; and removing first non-informational data from the transmit buffer;

and wherein combining the second non-informational data and the modified demodulated data comprises:

storing the modified demodulated data in a receive buffer at the second gateway; and inserting the second non-informational data into the receive buffer after a last received frame of the modified demodulated data.

5. The method according to claim 4, wherein the non-informational data comprises interframe fill flags.

6. The method according to claim 1, further comprising:

discriminating at the first gateway between voice and voice band modulated data signals; and switching at the first gateway to an alternate mode of signal processing to process voice band data as modem tones and modulated signals instead of voice.

7. The method according to claim 1, wherein the first gateway comprises a codec, a voice band data modem, and a fax modem, the method further comprising:

discriminating voice, voice band modulated data signals, and fax modulated data signals from the first modem;

processing the voice signals using the codec;

processing the voice band modulated data signals using the voice band data modem; and processing the fax modulated data signals using the fax modem.

8. The method according to claim 1, further comprising:

implementing at the first gateway, first modem training between the first modem and the first gateway;

implementing at the second gateway, second modem training between the second modem and the second gateway;

adjusting a duration of the first modem training based on progress of the second modem training; and adjusting a duration of the second modem training based on progress of the first modem training.

9. The method according to claim 1, wherein the first gateway has a first memory having a memory size, the method further comprising:

modifying at the first gateway supervisory data so that a maximum message length transmitted between the first and second modems is less than a predetermined limit based on the size of the first memory.

10. The method according to claim 1, wherein the narrowband network comprises a digital network; and the modulated signals from the first modem comprise pulse code modulated signals.

11. The method according to claim 1, wherein the narrowband network comprises a satellite network.

12. The method according to claim 1, wherein the narrowband network has a channel rate, the method further comprising:

selecting at each of the first and second gateways a modulation and demodulation scheme based on capabilities of the first and second modems and the channel rate.

13. The method according to claim 12, wherein the first and second modems comprise V.34 modems, and the capabilities of the first and second modems are determined by decoding a V.8 answer sequence generated by the first and second modems.

14. The method according to claim 12, wherein the first modem comprises a modem selected from the group consisting of a V.32 modem, a V.32 bis modem, a V.34 modem operating in auto-mode, and a V.90 modem operating in auto-mode, and wherein the selection of the modulation and demodulation scheme comprises detection of an 1800 Hz tone from the first modem.

15. The method according to claim 12, wherein the modulation and demodulation scheme and a rate of modulation and demodulation at the first and second gateways are different.

16. The method according to claim 15, wherein the modulation and demodulation scheme at the first gateway is V.32 at 4800 bps, and the modulation and demodulation scheme at the second gateway is V.22 bis at 2400 bps.

17. The method according to claim 15, wherein the modulation and demodulation scheme at the first gateway is V.32 at 9600 bps, and the modulation and demodulation scheme at the second gateway is V.32 at 4800 bps.

18. The method according to claim 15, wherein the modulation and demodulation scheme at the first gateway is V.32 bis at 14,400 bps or 12,000 bps or 9600 bps or 7200 bps or 4800 bps, and the modulation and demodulation scheme at the second gateway is V.32 bis at 14,400 bps or 12,000 bps or 9600 bps or 7200 bps or 4800 bps.

19. The method according to claim 1, wherein the end-to-end error correcting protocol is detected by the first gateway by decoding a V.8 sequence transmitted by the first and second modems.

20. The method according to claim 1, wherein the error correcting protocol is selected from a group consisting of V.42 LAPM and an error correcting protocol as defined in V.42 Annex A.

21. A method of data transmission between first and second modems over a network comprising a narrowband network, the method comprising:
    providing first and second gateways, the first gateway connected to the first modem, the second gateway connected to the second modem, the first and second gateways connected via the narrowband network;
    transmitting a first signal from the first modem to the first gateway;
    demodulating the first signal at the first gateway to generate demodulated data;
    modifying the demodulated data to remove first non-informational data;
    transmitting the modified demodulated data over the narrowband network;
    receiving the modified demodulated data at the second gateway;
    regenerating the demodulated data by inserting second non-informational data into the modified demodulated data;
    modulating the regenerated demodulated data at the second gateway to generate a second signal;
    transmitting the second signal from the second gateway to the second modem; and
    establishing an end-to-end protocol between the first and second modems, the protocol selected from a group consisting of an error correcting protocol or an asynchronous protocol.

22. The method according to claim 21, wherein modifying the demodulated data comprises:
    storing the demodulated data in a transmit buffer at the first gateway; and
    removing first non-informational data from the transmit buffer; and
    wherein regenerating the demodulated data comprises:
    storing the modified demodulated data in a receive buffer at the second gateway; and
    inserting second non-informational data into the receive buffer after a last received frame of the modified demodulated data.

23. The method according to claim 22, wherein the non-informational data comprises interframe fill flags.

24. The method according to claim 21, wherein the first gateway has a first memory having a memory size, the method further comprising: modifying at the first gateway supervisory data so that a maximum message length transmitted between the first and second modems is less than a predetermined limit based on the size of the first memory.

25. The method according to claim 21, wherein
    the narrowband network comprises a digital network; and
    the first and second signals comprise pulse code modulated signals.

26. A gateway for voice band data transmission over a network comprising a first modem connected to the gateway, a second modem connected to a second gateway, and a narrowband network connecting the gateway and the second gateway, the gateway comprising:
    a voice band data modem for demodulating signals received from a first user modem to generate demodulated data for transmission over the narrowband network, and for modulating data received from the narrowband network;
    a voice band data protocol for inter-networking of the first and second modems;
    a memory having a memory size; and
    a partial V.42 protocol for:
        detecting establishment of an end-to-end error correcting protocol between the first and second modems,
        monitoring at the first gateway the demodulated data,
        suspending transmission of the signals from the first modem if a transmission rate of the demodulated data to be transmitted over the narrowband network exceeds a first value,
        resuming transmission of the signals from the first modem if the transmission rate is less than a second value, and
    modifying supervisory data received from the narrowband network so that a maximum message length transmitted between the first and the second modems is less than a predetermined limit based on the size of the memory.

27. The gateway according to claim 26 comprising:
    a receive buffer for storing the data received from the narrowband network; and
    a transmit buffer for storing the demodulated data to be transmitted over the narrowband network;
    and wherein the partial V.42 protocol compares an amount of the demodulated data stored in the transmit buffer to a third value to determine if transmission of the signals from the first modem should be suspended.

28. The gateway according to claim 27 wherein the suspension of transmission of signals from the first modem comprises:
    generating a valid RNR frame;
    modulating the RNR frame; and
    transmitting the RNR frame to the first modem.

29. The gateway according to claim 28 wherein the resumption of transmission of signals from the first modem comprises:
    generating a valid RR frame;
    modulating the RR frame; and
    transmitting the RR frame to the first modem.

30. The gateway according to claim 27, wherein the partial V.42 protocol further comprises logic for:
    removing first non-informational data from the transmit buffer; and
    inserting second non-informational data into the receive buffer after a last received frame of the data received from the narrowband network.

31. A method of data transmission between first and second modems over a network comprising a narrowband network, the method comprising:
    providing first and second gateways, the first gateway connected to the first modem, the second gateway connected to the second modem, and the first and second gateways connected via the narrowband network;
    transmitting modulated signals from the first modem to the first gateway;

demodulating the signals at the first gateway to obtain demodulated data;

transmitting the demodulated data over the narrowband network;

receiving the demodulated data at the second gateway;

re-modulating the demodulated data at the second gateway;

transmitting the re-modulated signals from the second gateway to the second modem;

establishing an end-to-end error correcting protocol between the first and second modems;

monitoring at the first gateway the demodulated data to be transmitted over the narrowband network;

determining if an amount of demodulated data waiting in a buffer to be transmitted over the narrowband network exceeds a first value and if so, generating a valid receive not ready (RNR) frame, modulating the RNR frame at the first gateway, and transmitting the RNR frame to the first modem, thereby suspending the transmission of signals from the first modem; and determining if the amount of demodulated data waiting in the buffer to be transmitted over the narrowband network is less than a second value and, if so, generating a valid receive ready (RR) frame, modulating the RR frame at the first gateway, and transmitting the RR frame to the first modem, thereby resuming the transmission of signals from the first modem, further comprising:

implementing at the first gateway, first modem training between the first modem and the first gateway;

implementing at the second gateway, second modem training between the second modem and the second gateway;

adjusting a duration of the first modem training based on progress of the second modem training; and adjusting a duration of the second modem training based on progress of the first modem training.

32. A method of data transmission between first and second modems over a network comprising a narrowband network, the method comprising:

providing first and second gateways, the first gateway connected to the first modem, the second gateway connected to the second modem, and the first and second gateways connected via the narrowband network;

transmitting modulated signals from the first modem to the first gateway;

demodulating the signals at the first gateway to obtain demodulated data;

transmitting the demodulated data over the narrowband network;

receiving the demodulated data at the second gateway;

re-modulating the demodulated data at the second gateway;

transmitting the re-modulated signals from the second gateway to the second modem;

establishing an end-to-end error correcting protocol between the first and second modems;

monitoring at the first gateway the demodulated data to be transmitted over the narrowband network;

determining if an amount of demodulated data waiting in a buffer to be transmitted over the narrowband network exceeds a first value and if so, generating a valid receive not ready (RNR) frame, modulating the RNR frame at the first gateway, and transmitting the RNR frame to the first modem, thereby suspending the transmission of signals from the first modem; and determining if the amount of demodulated data waiting in the buffer to be transmitted over the narrowband network is less than a second value and, if so, generating a valid receive ready (RR) frame, modulating the RR frame at the first gateway, and transmitting the RR frame to the first modem, thereby resuming the transmission of signals from the first modem, wherein the first gateway has a first memory having a memory size, the method further comprising:

modifying at the first gateway supervisory data so that a maximum message length transmitted between the first and second modems is less than a predetermined limit based on the size of the first memory.

* * * * *